United States Patent
Kölker et al.

(10) Patent No.: US 9,967,111 B2
(45) Date of Patent: May 8, 2018

(54) SOFTWARE-DEFINED MULTINETWORK BRIDGE

(71) Applicant: Rackspace US, Inc., San Antonio, TX (US)

(72) Inventors: Jason Kölker, Live Oak, TX (US); Matthew Charles Dietz, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 374 days.

(21) Appl. No.: 13/843,591

(22) Filed: Mar. 15, 2013

(65) Prior Publication Data

US 2014/0280738 A1  Sep. 18, 2014

(51) Int. Cl.
G06F 15/16 (2006.01)
H04L 12/46 (2006.01)

(52) U.S. Cl.
CPC ............ *H04L 12/46* (2013.01); *H04L 12/462* (2013.01)

(58) Field of Classification Search
CPC . H04L 12/46; H04L 12/462; H04L 12/40091; H04L 12/40097; H04L 12/2832; H04L 12/4635; H04L 2012/5618
USPC ................................ 709/218, 226; 390/395
See application file for complete search history.

(56) References Cited

U.S. PATENT DOCUMENTS

| | | | |
|---|---|---|---|
| 6,963,916 B1 * | 11/2005 | Pugaczewski | H04L 41/0806 709/218 |
| 8,660,129 B1 * | 2/2014 | Brendel et al. | 370/397 |
| 8,824,485 B2 * | 9/2014 | Biswas | H04L 49/70 370/395.53 |
| 9,294,524 B2 | 3/2016 | Raman | |
| 2007/0266433 A1 * | 11/2007 | Moore | G06F 21/53 726/15 |
| 2011/0022812 A1 * | 1/2011 | van der Linden et al. | 711/163 |
| 2011/0134793 A1 * | 6/2011 | Elsen | H04L 12/462 370/254 |
| 2011/0142053 A1 * | 6/2011 | Van Der Merwe et al. | 370/395.1 |
| 2012/0014387 A1 * | 1/2012 | Dunbar et al. | 370/395.53 |
| 2012/0099602 A1 | 4/2012 | Nagapudi et al. | |
| 2012/0163388 A1 * | 6/2012 | Goel | H04L 12/4641 370/395.53 |
| 2012/0233668 A1 * | 9/2012 | Leafe et al. | 726/4 |

(Continued)

OTHER PUBLICATIONS ("Network-virtualization-encapsulation-and-stateless-tcp-transport-stt", Posted on Mar. 4, 2012 at networkheresay.com website http://networkheresy.com/2012/03/04/network-virtualization-encapsulation-and-stateless-tcp-transport-stt/).*

*Primary Examiner* — Dhairya A Patel
(74) *Attorney, Agent, or Firm* — Haynes and Boone, LLP

(57) ABSTRACT

An example system for bridging between networks includes a first server that launches a first virtual machine in a first network. The system includes a first network controller that is coupled to the first network and sends a request for a bridge between the first network and a second network. The system also includes a second server that launches a second virtual machine in the second network. The system further includes a second network controller that is coupled to the second network, receives the request for the bridge, and in response to the request, creates the bridge between the first and second networks. The bridge enables the first virtual machine in the first network to communicate with the second virtual machine in the second network.

21 Claims, 6 Drawing Sheets

(56) References Cited

U.S. PATENT DOCUMENTS

| | | | |
|---|---|---|---|
| 2012/0278802 A1* | 11/2012 | Nilakantan | G06F 9/45558 718/1 |
| 2012/0281708 A1* | 11/2012 | Chauhan | H04L 63/0272 370/401 |
| 2012/0287936 A1* | 11/2012 | Biswas et al. | 370/395.3 |
| 2013/0044636 A1* | 2/2013 | Koponen et al. | 370/254 |
| 2013/0044641 A1* | 2/2013 | Koponen | H04L 12/66 370/255 |
| 2013/0136126 A1* | 5/2013 | Wang | H04L 61/103 370/392 |
| 2013/0219384 A1* | 8/2013 | Srinivasan | G06F 9/45558 718/1 |
| 2013/0329728 A1* | 12/2013 | Ramesh | 370/390 |
| 2014/0003249 A1* | 1/2014 | Cai | H04L 43/10 370/241 |
| 2014/0013324 A1* | 1/2014 | Zhang | H04L 49/70 718/1 |
| 2014/0123135 A1* | 5/2014 | Huang et al. | 718/1 |
| 2014/0123268 A1* | 5/2014 | Farina et al. | 726/15 |

\* cited by examiner

SOFTWARE-DEFINED MULTINETWORK BRIDGE

BACKGROUND

The present disclosure relates generally to cloud computing, and more particularly to network management.

Cloud computing services can provide computational capacity, data access, networking/routing and storage services via a large pool of shared resources operated by a cloud computing provider. Because the computing resources are delivered over a network, cloud computing is location-independent computing, with resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that a user can access and use through a web browser as if it were a program installed locally on the user's own computer. Details are abstracted from consumers, who no longer have need for expertise in, or control over, the technology infrastructure "in the cloud" that supports them. Cloud computing infrastructures may consist of services delivered through common centers and built on servers. Clouds may appear as single points of access for consumers' computing needs, and may not require end-user knowledge of the physical location and configuration of the system that delivers the services.

The cloud computing utility model is useful because many of the computers in place in data centers today are underutilized in computing power and networking bandwidth. A user may briefly need a large amount of computing capacity to complete a computation for example, but may not need the computing power once the computation is done. The cloud computing utility model provides computing resources on an on-demand basis with the flexibility to bring the resources up or down through automation or with little intervention.

DETAILED DESCRIPTION

Figure 1:
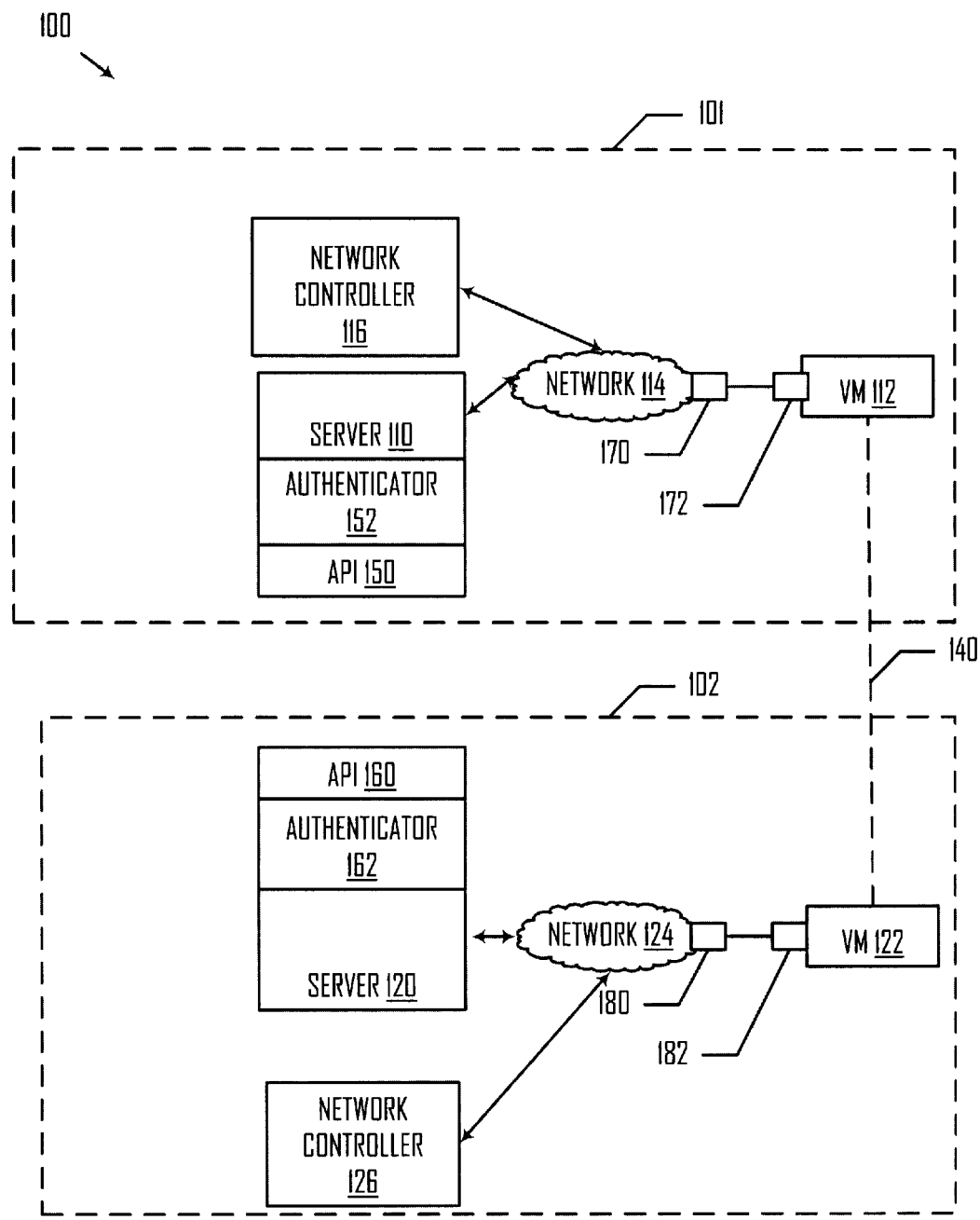
FIG. 1 is a simplified block diagram illustrating a system for bridging between two networks, according to an embodiment.

I. Overview
II. Example System Architecture
   A. Bridging Networks
   B. Authentication
III. Example Methods
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A cloud operating system may work as a part of a cloud computing architecture designed to allow control and management of pools of resources accessible by various components of the system. Control and utilization of these resources may be abstracted at multiple levels through various components of the system. A network controller may provide a virtual network service in the system. In an example, the network controller may enable a tenant to dynamically request and configure a virtual network.

The network controller may provide a software layer that controls the networking portion of an Infrastructure as a Service (IaaS) cloud computing platform. In an example, the network controller may provide a tenant-facing API that exposes logical abstractions for consuming network services as well as backend implementations of those APIs in order to provide the underlying functionality. The network controller may provide tenant control of networking topology and addressing. In an example, the network controller provides a "plugin" mechanism to enable different technologies and implements calls to these technologies via the API. This may enable users and administrators to pick and choose the networking technologies that are right for them.

Tenants of cloud computing systems may desire the ability to create rich enterprise network topologies. The network controller may allow cloud tenants to: (i) create multitier networks (e.g., web tier, app tier, database tier); (ii) control Internet Protocol (IP) addressing; (iii) insert and configure services such as firewalls and intrusion prevention systems; and (iv) implement virtual private networks (VPNs) and bridges to remote physical hosting solutions or customer premises. Further, the network controller may allow tenants and cloud service providers the ability to deploy and manage state-of-the-art network systems through the provisioning of virtual networking resources.

The network controller may be operably connected to and configured to work in conjunction with one or more other components of the system, including, but not limited to, one or more storage components, one or more computing components, one or more administrative components (e.g., dashboard components), one or more shared service components, or any combination thereof. As such, the network controller may work in connection with numerous other components to provide an entire IaaS platform.

The computing component may launch virtual machines in a network. In an embodiment, a system for bridging between networks includes a first server that launches a first virtual machine in a first network. The system may also include a first network controller that is coupled to the first network and sends a request for a bridge between the first network and a second network. The system may further include a second server that launches a second virtual machine in the second network. The system may also include a second network controller that is coupled to the second network, and that receives the request for the bridge, and in response to the request, creates the bridge between the first and second networks. The bridge enables the first virtual machine in the first network to communicate with the second virtual machine in the second network.

II. Example System Architecture

Referring now to FIG. 1, an embodiment of a system 100 for bridging between networks is illustrated.

System 100 includes an environment 101 and an environment 102. In an embodiment, environment 101 is managed by a first cloud service provider and environment 102 is managed by a second cloud service provider. In an example, the first and second cloud service providers are the same. In another example, the first and second cloud service providers are different.

The following is a description of environment 101. This description applies as well to environment 102. Environment 101 includes a server 110 that may launch a virtual machine (VM) 112 in a network 114. A client may use server 110 to launch VMs in environment 101. The client may desire to launch a VM in environment 101 and in another environment (e.g., environment 200). The client may desire to launch the VM in a different environment for a variety of reasons. In an example, the client may have computationally expensive work items to process and may desire to launch VMs in environment 102, which may have fast performance but may also be more expensive, to process at least some of the work items. In another example, the client may desire to migrate the VM running in a first environment to another environment. To assist in the migration, the migrating VM may initiate sending its data to the remote VM and then migrate to the second environment after, for example, a threshold amount of data has been sent to the remote VM.

A. Bridging Networks

Server 110 is coupled to a network controller 116 that may provide network connectivity for VMs running in environment 101. Network controller 116 is coupled to network 114. Server 110 may launch VM 112, and network controller 116 may determine and assign a virtual port 170 and a virtual interface 172 for VM 112. Network controller 116 may connect VM 112 to network 114 via the assigned virtual port and virtual interface. VM 112 may then be connected network 114 and be able to communicate with other nodes that are also connected to network 114. Network controller 116 may also assign other network data to VM 112, such as an Internet Protocol (IP) address, media access control (MAC) address, and subnet.

Environment 102 includes a server 120, VM 122, network 124, and network controller 126. Server 120 may launch one or more VMs in a network 124. Server 120 is coupled to a network controller 126 that may provide network connectivity for VMs running in environment 102. Network controller 126 is coupled to network 124. Server 120 may launch VM 122, and network controller 126 may determine and assign a virtual port 180 and a virtual interface 182 for VM 122. Network controller 126 may connect VM 122 to network 124 via the assigned virtual port and virtual interface. VM 122 may then be connected network 124 and be able to communicate with other nodes that are also connected to network 124. Network controller 126 may also assign other network data to VM 122, such as an Internet Protocol (IP) address, media access control (MAC) address, and subnet.

Networks 114 and 124 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

In an embodiment, network controller 116 sends a request for a bridge 140 between network 114 and network 124. The request may be sent to network controller 126 in environment 102. Network controller 126 is coupled to an application programming interface (API) 160. In an example, a client running VMs in environment 101 may invoke API 160 to request bridge 140.

Network controller 126 may receive the request for the bridge and create bridge 140 between networks 140 and 124. Further, in response to the request, server 120 may launch VM 122. As discussed above, VM 122 may be associated with network data. In an example, network controller 126 specifies the IP address for the endpoint local to environment 102 on which packets sent through bridge 140 are received. Network controller 126 may connect VM 122 to network 124 via the virtual interface and virtual port assigned to VM 122.

Network controller 116 may receive the network data (e.g., IP address) associated with VM 122 in environment 102 and use the network data to communicate with VM 122. The bridge may enable VM 112 in network 114 to communicate with VM 122 in network 124.

In an example, the user may login to environment 102 and point VM 122 to VM 112. Network controllers 116 and 126 may provide Layer-2 network connectivity for VMs running in their environment. After the bridge is created, VMs 112 and 122 may be on the same Layer 2 network segment and any VM connected to the Layer 2 network segment may send and receive broadcast messages from other VMs connected to the Layer 2 network segment. In an example, network controller 116 broadcasts a message using VM 122's IP address and VM 122 receives the broadcasted message and responds back, setting up the direct connection between VMs 112 and 122.

In an embodiment, network controller 116 is coupled to a first plugin, and network controller 126 is coupled to a second plugin different from the first plugin.

The first plugin may create a first virtual network and the second plugin may create a second virtual network, and the bridge may connect the first and second virtual networks. The first and second plugins may create virtual networks differently. Regardless of the whether network controllers 116 and 126 use different plugins, the VMs that are associated with each network controller may communicate.

The bridge that is created may be any type of bridge that is capable of allowing VMs 112 and 122 to communicate. In an example, the bridge uses a generic routing encapsulation (GRE) tunnel. In another example, the bridge uses a stateless transport tunnel (STT). In another example, the bridge uses a virtual private network (VPN) to encrypt traffic between networks 114 and 124. In another example, the bridge uses network virtualization using generic routing encapsulation (NVGRE). In another example, the bridge uses virtual extensible local area network (VXLAN). NVGRE may use GRE to tunnel Layer 2 packets over Layer 3 networks. VXLAN may create Layer 2 logical networks that are encapsulated in standard Layer 3 IP packets.

In another example, the bridge uses multiprotocol label switching (MPLS). MPLS may be used to tunnel multiple traffic types through the core of the network. Tunneling may be advantageous because only the routers at the egress and ingress of the tunnel need to understand the context of the underlying traffic carried over the tunnel (e.g., the protocol that the traffic belongs to and the reachability information required to route and forward it in its native form). This detail may be hidden from routers in the core of the network. Accordingly, core devices may only need to carry sufficient state to enable them to switch MPLS-encapsulated packets without regard to their underlying content. Further, an MPLS tunnel may provide an extra layer of security because the only place where data may be injected into an MPLS tunnel may be at the head end of that tunnel.

The user may specify when to destroy the bridge. In keeping with the above example, the bridge may be destroyed when the computationally intensive work items have finished processing. In another example, the bridge may be destroyed when the migrating VM has finished its migration to the other environment. Network controller 116 may destroy the bridge, and after network controller 116 destroys the bridge, communications between VMs 112 and 122 are disabled.

Figure 2:
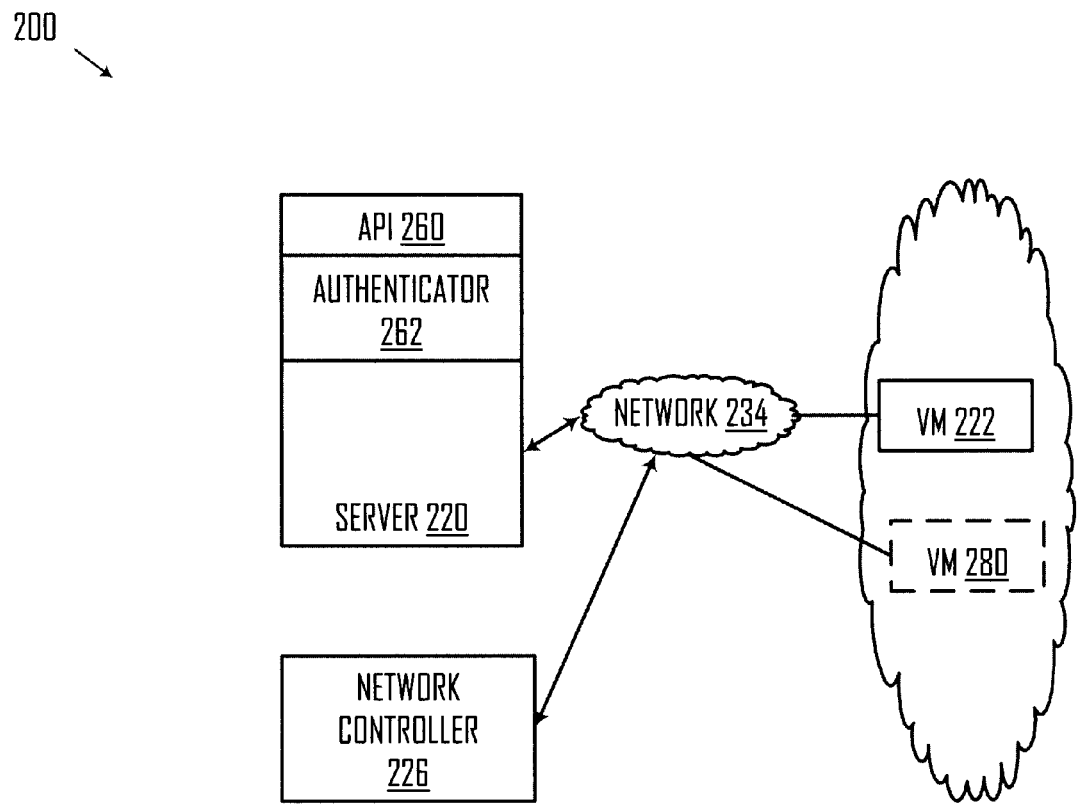
FIG. 2 is a simplified block diagram illustrating a system from the perspective of VMs connected to the bridge, according to an embodiment.

FIG. 2 is a simplified block diagram 200 illustrating a system from the perspective of VMs connected to the bridge, according to an embodiment.

Diagram 200 includes a server 220 coupled to a network 234 and a launched VM 222. A bridge may be set up between VMs 222 and 280 such that the VMs operate as if the VMs were connected via a local network. VM 280 is shown in dashed lines, indicating that in reality, VM 280 is located in another network.

B. Authentication

It may be desirable to authenticate the clients requesting the bridge. Referring back to FIG. 1, environment 101 includes an authenticator 152, and environment 102 includes an authenticator 162. In an embodiment, network controller 116 exposes an authentication service provided by authenticator 152, and network controller 126 exposes an authentication service provided by authenticator 162. The authentication service authenticates a sender of the request for the bridge and accepts credentials from a server.

In an example, authenticator 162 in environment 102 authenticates a sender of the request for the bridge and accepts credentials from environment 101. In an example, server 110 in environment 101 sends the client's credentials to authenticator 162 in environment 102. Authenticator 162 may then authenticate with the client based on the credential presented.

The credentials may be any credentials known to an authenticator. In an example, the authenticator in a cloud may forward requests on behalf of the user using additional supplied credentials known to the remote cloud's authenticator. In an example, the credentials include a username and password of the client. In another example, the credentials include an access token having an expiration date. The access token may provide a secure technique to pass credentials because the access token expires after a time period (e.g., 30 minutes).

As discussed above and further emphasized here, FIG. 1 is merely an example, which should not unduly limit the scope of the claims. For example, although system 100 is described herein with one VM running in network 114 and one VM running in network 124, other embodiments running more than one VM in each network are within the scope of the disclosure.

III. Example Methods

Figure 3:
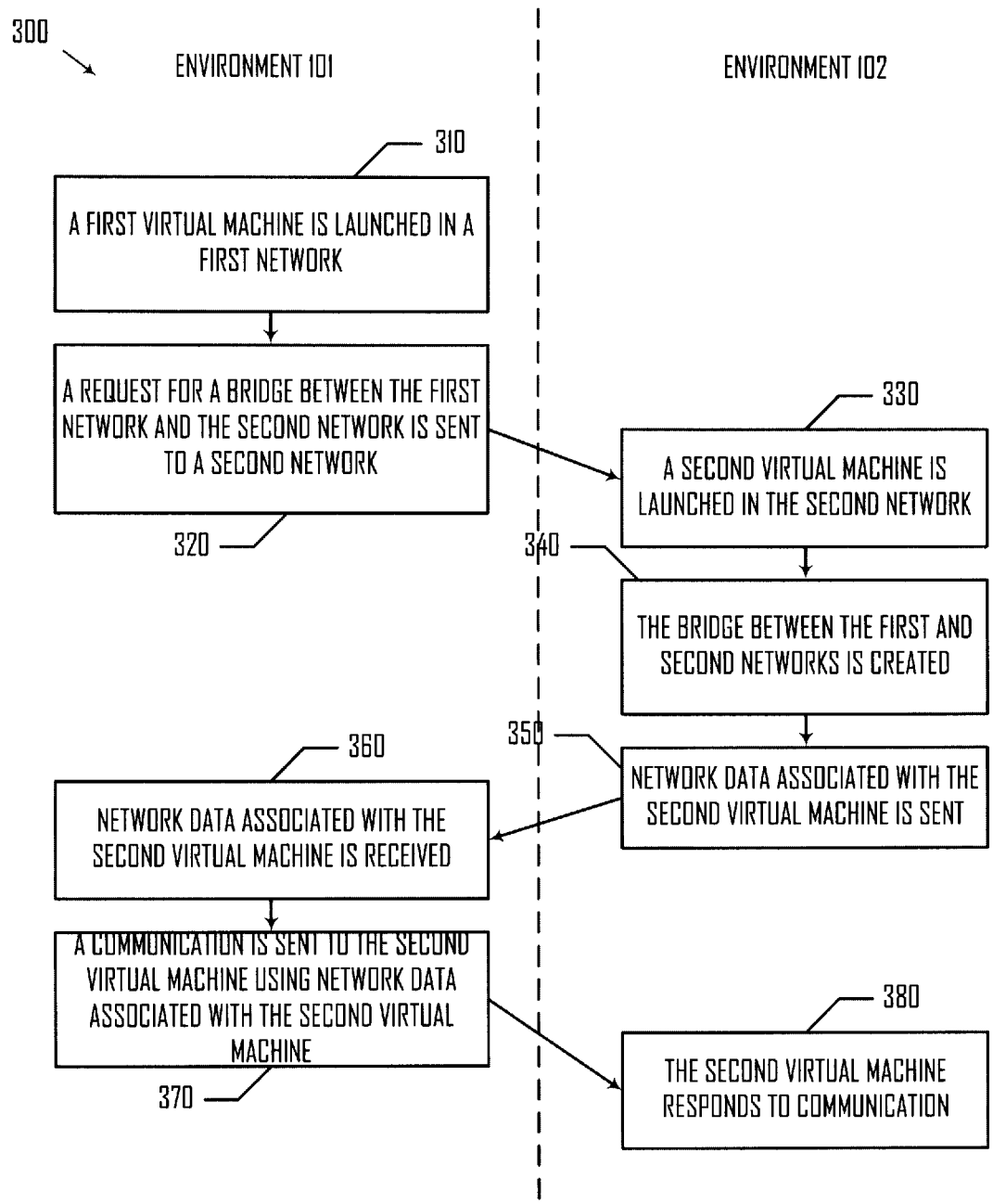
FIG. 3 is a swim diagram showing a method of bridging between networks, according to an embodiment.

FIG. 3 is a swim diagram showing a method 300 of bridging between networks, according to an embodiment. Method 300 is not meant to be limiting and may be used in other applications.

Method 300 includes steps 310-380. In a step 310, a first virtual machine is launched in a first network. In an example, server 110 may launch VM 112 in network 114. In a step 320, a request for a bridge between the first network and the second network is sent to a second network. In an example, network controller 116 sends to network 124 a request for a bridge between network 114 and network 124.

In a step 330, a second virtual machine is launched in the second network. In an example, server 120 launches VM 122 in network 124. In a step 340, the bridge between the first and second networks is created. In an example, network controller 126 creates the bridge between networks 114 and 124. In a step 350, network data associated with the second virtual machine is sent. In an example, network controller 126 sends to network 114 network data associated with VM 122.

In a step 360, network data associated with the second virtual machine is received. In an example, network controller 126 receives network data associated with VM 122. In a step 370, a communication is sent to the second virtual machine using network data associated with the second virtual machine. In an example, a network controller 126 sends a communication to VM 122 using network data associated with VM 122. In a step 380, the second virtual machine responds to the communication. In an example, virtual machine 122 may respond to the communication. VMs 112 and 122 may continue to communicate through bridge 140.

It is also understood that additional method steps may be performed before, during, or after steps 310-380 discussed above. It is also understood that one or more of the steps of method 300 described herein may be omitted, combined, or performed in a different sequence as desired.

Figure 4:
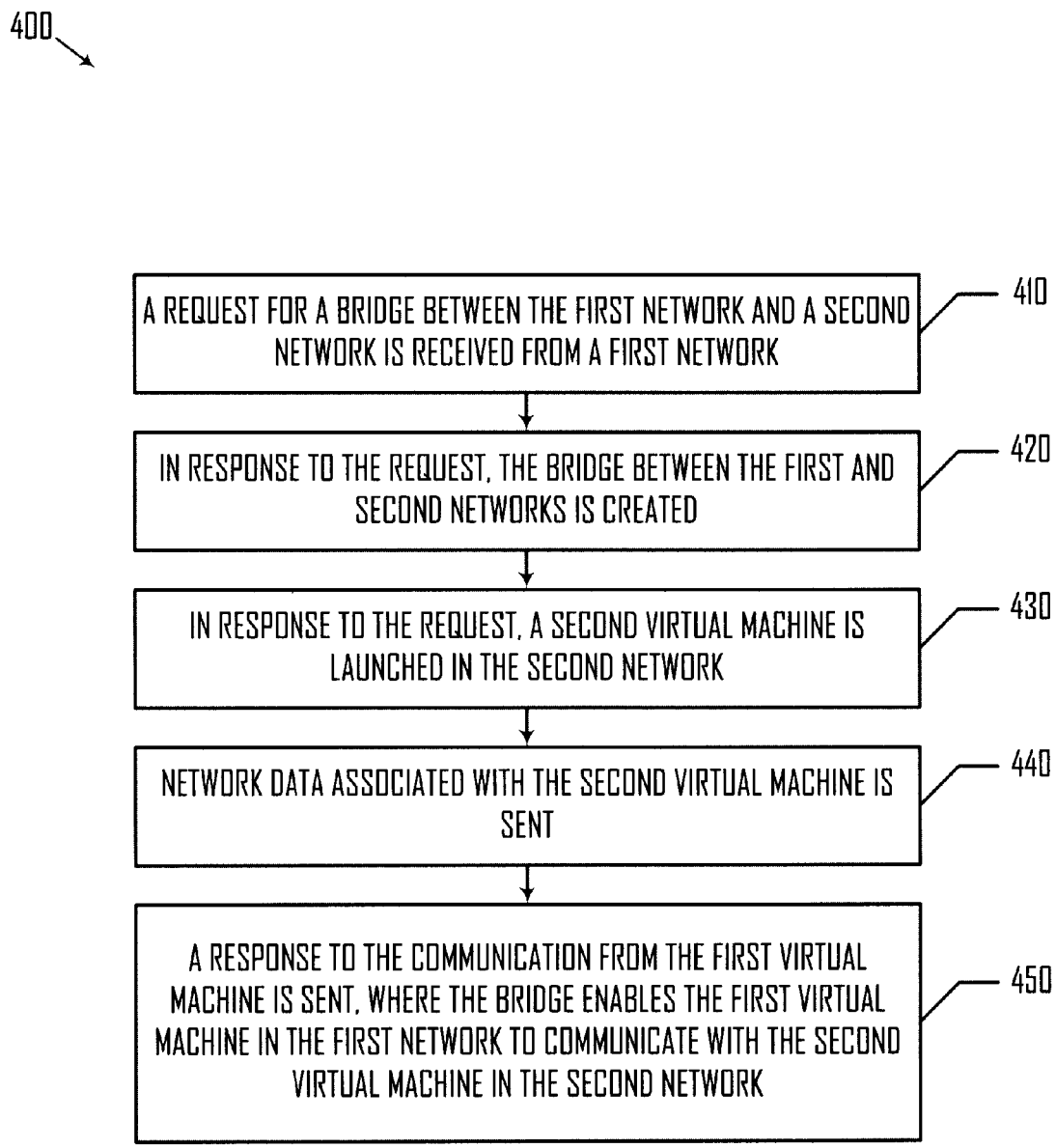
FIG. 4 is a flow chart showing a method of bridging between networks, according to an embodiment.

FIG. 4 is a flow chart showing a method 400 of bridging between networks, according to an embodiment. Method 400 is not meant to be limiting and may be used in other applications.

Method 400 includes steps 410-450. In a step 410, a request for a bridge between the first network and a second network is received from a first network. In an example, network controller 126 receives from network 114 a request for a bridge between networks 114 and 124.

In a step 420, in response to the request, the bridge between the first and second networks is created. In an example, in response to the request, network controller 126 creates the bridge between networks 114 and 124.

In a step 430, in response to the request, a second virtual machine in the second network is launched. In an example, in response to the request, sever 120 launches VM 122 in network 124. In a step 440, network data associated with the second virtual machine is sent. In an example, network controller 126 sends network data associated with VM 122.

In a step 450, a response to the communication from the first virtual machine is sent, wherein the bridge enables the first virtual machine in the first network to communicate with the second virtual machine in the second network. In an example, VM 122 sends a response to the communication from VM 112, wherein the bridge enables VM 112 in network 114 to communicate with VM 122 in network 124.

It is also understood that additional method steps may be performed before, during, or after steps 410-450 discussed above. It is also understood that one or more of the steps of method 400 described herein may be omitted, combined, or performed in a different sequence as desired.

Figure 5:
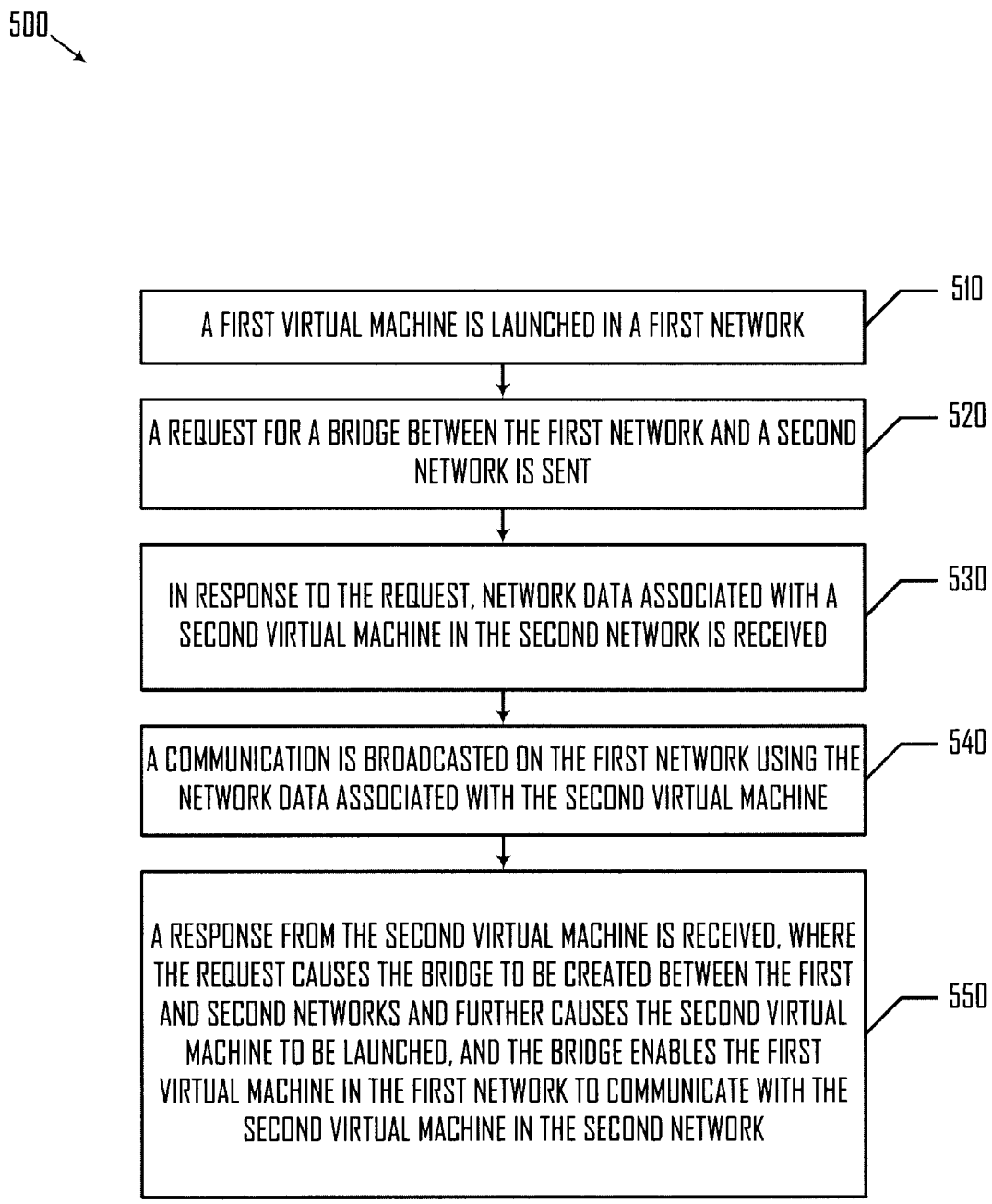
FIG. 5 is a flow chart showing a method of bridging between networks, according to an embodiment.

FIG. 5 is a flow chart showing a method 500 of bridging between networks, according to an embodiment. Method 500 is not meant to be limiting and may be used in other applications.

Method 500 includes steps 510-550. In a step 510, a first virtual machine is launched in a first network. In an example, server 110 launches VM 112 in network 114. In a step 520, a request for a bridge between the first network and a second network is sent. In an example, network controller 116 sends a request for a bridge between network 114 and network 124.

In a step 530, in response to the request, network data associated with a second virtual machine in the second network is received. In an example, in response to the request, network controller 116 receives network data associated with VM 122 in network 124. In a step 540, a communication is broadcast on the first network using the network data associated with the second virtual machine. In an example, network controller 116 broadcasts a communication on network 114 using the network data associated with VM 122.

In a step 550, a response from the second virtual machine is received, where the request causes the bridge to be created between the first and second networks and further causes the second virtual machine to be launched, and the bridge enables the first virtual machine in the first network to communicate with the second virtual machine in the second network. In an example, VM 112 receives a response from VM 122, where the request causes the bridge to be created between networks 114 and 124 and further causes VM 122 to be launched, and the bridge enables VM 112 in network 114 to communicate with the VM 122 in network 124.

It is also understood that additional method steps may be performed before, during, or after steps 510-550 discussed above. It is also understood that one or more of the steps of method 500 described herein may be omitted, combined, or performed in a different sequence as desired.

IV. Example Computing System

Figure 6:
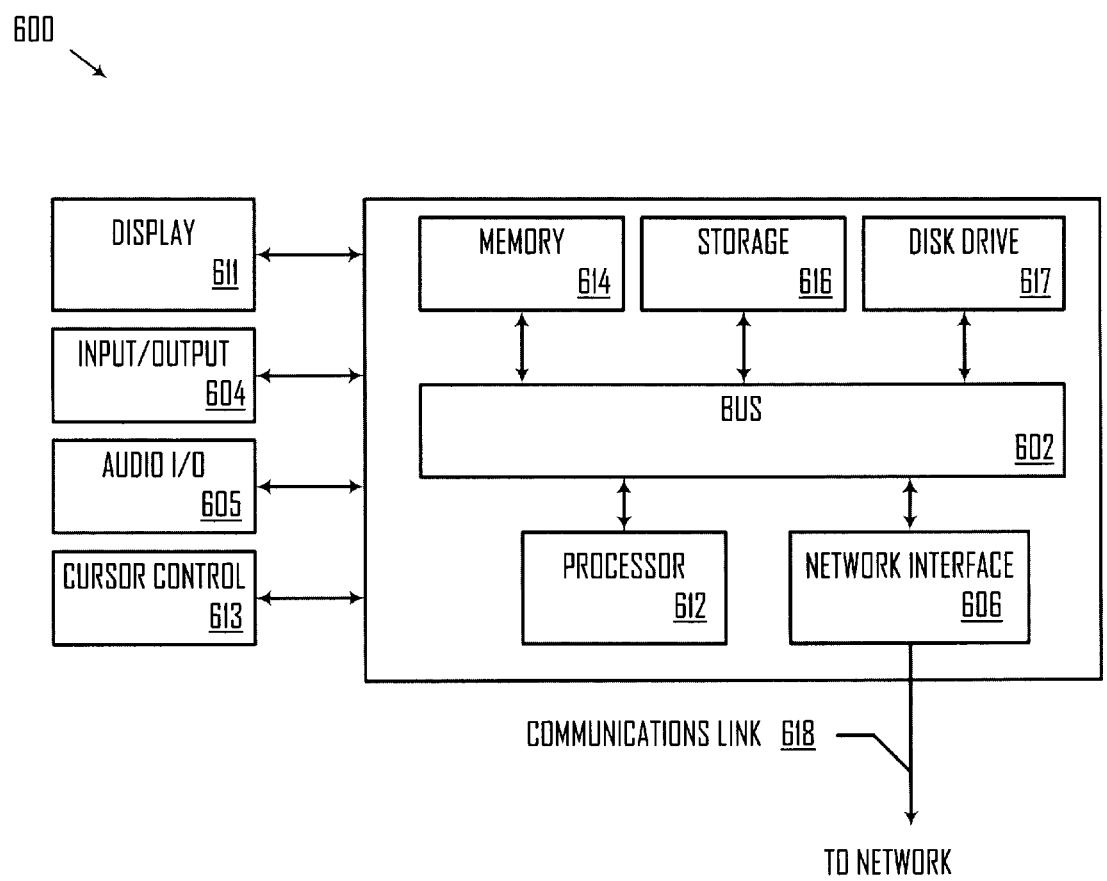
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, network controllers 116 or 126 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 100. In various other embodiments of the present disclosure, a plurality of computer systems 100 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. In an example, network controller 110 may be a software module running in a server. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for bridging between networks, the system comprising:
   a processor; a memory;
   a first server that launches a first virtual machine in a first network;
   a first network controller providing user control of networking topology and addressing that is coupled to the first network, wherein the first network controller sends a request for a bridge between the first network and a second network, assigns a virtual port and a first virtual interface to the first virtual machine, and connects the first virtual machine to the first network via the first virtual port and the first virtual interface;
   a second server, wherein response to the request, the second server launches a second virtual machine in the second network; and
   a second network controller that is coupled to the second network, assigns a second virtual port and a second virtual interface to the second virtual machine, and connects the second virtual machine to the second network via the second virtual port and the second virtual interface, wherein the first network controller is different from the second network controller,
   wherein in response to the request, the second virtual machine sends network data associated with the second virtual machine to the first virtual machine, wherein the bridge enables the first virtual machine in the first network to communicate with the second virtual machine in the second network via the first and second virtual ports and the first and second virtual interfaces, and wherein after the bridge is created, the first and second virtual machines are effectively on a same layer 2 network segment.

2. The system of claim 1, wherein the first network is maintained by a first service provider, and the second network is maintained by a second service provider different from the first service provider.

3. The system of claim 1, wherein in response to the request, the first network controller receives network data associated with the second virtual machine and uses the network data to communicate with the second virtual machine.

4. The system of claim 1, wherein the bridge uses a generic routing encapsulation (GRE) tunnel.

5. The system of claim 1, wherein the bridge uses a stateless transport tunnel (STT).

6. The system of claim 1, wherein the bridge uses a virtual private network (VPN) to encrypt traffic between the first and second networks.

7. The system of claim 1, wherein the bridge uses multiprotocol label switching (MPLS).

8. The system of claim 1, wherein the bridge uses network virtualization using generic routing encapsulation (NVGRE).

9. The system of claim 1, wherein the bridge uses virtual extensible local area network (VXLAN).

10. The system of claim 1, wherein the first network controller is coupled to a first plugin, and the second network controller is coupled to a second plugin different from the first plugin, wherein the first plugin creates a first virtual network and the second plugin creates a second virtual network, and the bridge connects the first and second virtual networks.

11. The system of claim 1, wherein the first and second plugins create virtual networks differently.

12. The system of claim 11, wherein an authenticator is coupled to the second server and receives credentials from the first network to authenticate a client associated with the first network.

13. The system of claim 11, wherein the credentials include an access token having an expiration date.

14. The system of claim 1, wherein the first network controller destroys the bridge, and after the first network controller destroys the bridge, communications between the first and second virtual machines are disabled.

15. The system of claim 1, wherein the second network controller destroys the bridge, and after the second network controller destroys the bridge, communications between the first and second virtual machines are disabled.

16. A system for bridging between networks, the system comprising:
   a processor; a memory;
   a first server that launches a first virtual machine in a first network;
   a first network controller providing user control of networking topology and addressing that is coupled to the first network, wherein the first network controller sends a request for a bridge between the first network and a second network, assigns a first virtual port and the first virtual interface, and wherein in response to the request receives network data associated with a second virtual machine in the second network,
   wherein the first network controller broadcasts a communication on the first network using the network data associated with the second virtual machine, and receives a response from the second virtual machine,
   wherein the request causes a second network controller that is coupled to the second network to create the bridge between the first and second networks and further causes a second server to launch the second virtual machine, wherein the first network controller is different from the second network controller,
   wherein the bridge enables the first virtual machine in the first network to communicate with the second virtual machine in the second network using the first virtual port, the first virtual interface, and the network data and wherein after the bridge is created, the first and second virtual machines are effectively on a same layer 2 network segment.

17. The system of claim 16, wherein the first network is maintained by a first service provider, and the second network is maintained by a second service provider different from the first service provider.

18. The system of claim 16, wherein the bridge uses at least one of a generic routing encapsulation (GRE) tunnel, stateless transport tunnel (STT), virtual private network (VPN) to encrypt traffic between the first and second networks, multiprotocol label switching (MPLS), generic routing encapsulation (NVGRE), and virtual extensible local area network (VXLAN).

19. The system of claim 16, wherein the first network controller is coupled to a first plugin, and the second network controller is coupled to a second plugin different from the first plugin, wherein the first plugin creates a first virtual network and the second plugin creates a second virtual network, and the bridge connects the first and second virtual networks.

20. A method of bridging between networks, the method comprising:

launching a first virtual machine in a first network;

sending, by a first network controller providing user control of networking topology and addressing, a request for a bridge between the first network and a second network;

assigning, by the first network controller, a first virtual port and a first virtual interface to the first virtual machine, connecting, by the first network controller, the first virtual machine to the first network via the first virtual port and the first virtual interface;

launching a second virtual machine in the second network; and in response to receiving the request, creating, by a second network controller, a bridge between the first and second networks, wherein creating the bridge includes assigning a second virtual port and a second virtual interface to the second virtual machine, connecting the second virtual machine to the second network via the second virtual port and the second virtual interface, and sending network data associated with the second virtual machine to the first virtual machine, wherein the first network controller is different from the second network controller, wherein the bridge enables the first virtual machine in the first network to communicate with the second virtual machine in the second network via the first and second virtual ports and the first and second virtual interfaces, and wherein after the bridge is created, the first and second virtual machines are effectively on a same layer 2 network segment.

21. The method of claim 20, wherein the first network is maintained by a first service provider, and the second network is maintained by a second service provider different from the first service provider.

\* \* \* \* \*